US 6,604,434 B1

(12) United States Patent
Hamilton et al.

(10) Patent No.: US 6,604,434 B1
(45) Date of Patent: Aug. 12, 2003

(54) METHOD AND APPARATUS FOR DETERMINING THE DIRECTION AND RATE OF A ROTATING ELEMENT

(75) Inventors: David Hamilton, Auburn, AL (US); Walter Castleberry, Pike Road, AL (US); John Scarborough, Auburn, AL (US)

(73) Assignee: Neptune Technology Group, Inc., Tallasee, AL (US)

( * ) Notice: Subject to any disclaimer, the term of this patent is extended or adjusted under 35 U.S.C. 154(b) by 51 days.

(21) Appl. No.: 09/602,038

(22) Filed: Jun. 23, 2000

(51) Int. Cl.[7] ................................................. G01F 1/28
(52) U.S. Cl. ......................... 73/861.75; 73/861.83; 324/207.21
(58) Field of Search ..................... 73/861.75, 861.77, 73/861.83, 861.87, 861.88, 861.89, 861.94, 861; 324/207.21, 207.2, 207.25, 165, 166, 173, 174

(56) References Cited

U.S. PATENT DOCUMENTS

| | | | |
|---|---|---|---|
| 3,388,595 A | | 6/1968 | Last et al. |
| 3,685,353 A | | 8/1972 | Gestler |
| 3,820,090 A | | 6/1974 | Wiegand |
| 3,949,606 A | | 4/1976 | Blancett |
| 4,132,981 A | | 1/1979 | White |
| 4,265,127 A | | 5/1981 | Onada |
| 4,306,457 A | * | 12/1981 | Fukui et al. ............. 73/861.77 |
| 4,308,755 A | * | 1/1982 | Millar et al. ............. 73/861.77 |
| 4,461,174 A | | 7/1984 | Han |
| 4,555,685 A | * | 11/1985 | Maruyama .................. 335/303 |
| 4,579,008 A | | 4/1986 | Bohm et al. |
| 4,783,990 A | | 11/1988 | Eberle et al. |
| 4,793,192 A | | 12/1988 | Jerger et al. |
| 5,046,369 A | | 9/1991 | Boyd et al. |
| 5,187,989 A | | 2/1993 | Butteau |
| 5,199,307 A | * | 4/1993 | Onoda et al. ............. 73/861.78 |
| 5,216,924 A | * | 6/1993 | Le Breton .................... 73/155 |
| 5,325,715 A | * | 7/1994 | Foran, Jr. et al. ............. 73/261 |
| 5,530,298 A | | 6/1996 | Gerhold |
| 5,546,801 A | | 8/1996 | Swinson et al. |
| 5,632,169 A | | 5/1997 | Clark et al. |
| 5,691,484 A | * | 11/1997 | Feller ...................... 73/861.13 |
| 5,782,263 A | | 7/1998 | Isaacson, Jr. et al. |

(List continued on next page.)

FOREIGN PATENT DOCUMENTS

| | | | | |
|---|---|---|---|---|
| GB | 2102129 | | 1/1983 | |
| GB | 2 102 129 A | * | 1/1983 | ............. G01F/1/05 |
| GB | 2102129 A B1 | * | 1/1983 | ............. G01F/1/05 |
| WO | 9930288 | | 6/1999 | |
| WO | 9939301 | | 8/1999 | |
| WO | 9954685 | | 10/1999 | |
| WO | 0017997 | | 3/2000 | |
| WO | 0033028 | | 6/2000 | |

OTHER PUBLICATIONS

Frederic Puybaret, Denis Vernizeau; Effet Wiegand; p. 2, p. 3, p. 4, p. 11, p. 12, p. 13, p. 14, p. 15, p. 22, p. 24; dated Jan. 5, 1993.

(List continued on next page.)

Primary Examiner—Edward Lefkowitz
Assistant Examiner—Corey D. Mack
(74) Attorney, Agent, or Firm—Bradley Arant Rose & White LLP; David E. Mixon, Esq.

(57) ABSTRACT

The present invention provides a device for measuring both the magnitude of rotation of a rotating magnetic field as well as the direction of rotation of a rotating magnetic field. The present invention may be used to measure the magnitude and direction of fluid flow by converting the kinetic energy of a moving fluid into a rotating magnetic field. At least two stationary sensors are placed in the magnetic field to detect the resulting changes in magnetic flux polarity occurring and provide therefrom a determination of the magnitude and direction of fluid flow.

27 Claims, 10 Drawing Sheets

U.S. PATENT DOCUMENTS

| | | | |
|---|---|---|---|
| 5,824,896 | A | 10/1998 | Lee |
| 5,898,241 | A | 4/1999 | Ganderillas |
| 5,908,103 | A | 6/1999 | Dlugos |
| 6,085,599 | A * | 7/2000 | Feller .................. 73/861.13 |
| 6,098,456 | A | 8/2000 | Munck |
| 6,125,697 | A | 10/2000 | Holton et al. |
| 6,191,687 | B1 | 2/2001 | Dlugos et al. |

OTHER PUBLICATIONS

D. Lautru, LF Statique—Rapport sur l'effet Wiegand; p. 2, p. 3, p. 6; p.7, p. 15; Dated Aug. 28, 1995.

D. Lautru, LF Statique—Rapport sur les essais Wiegand; p. 1, p. 3, p. 6; Dated Sep. 15, 1995.

Fisher–Rosemont; Model 0355 UMB Power Pulser, Installation and Operation Manual, p. 4, p. 8; Dated Feb., 1996.

DE 3046804 A1 Offenlegung sschrift.

Richard R. Gerhold—Generateur d'Impulsions a l'etat solide; 2709 620; 94 10552.

Vacuumschmelze GMBH—Pulse Wire Sensors; Feb. 1992 TAN 580/12.

Hersey Products, model SER–1; Dated Jan. 1996.

Vacuumschmelze; Datenblatt—Specification; Aug. 12, 1993.

Wiegand Effect Sensors, Joseph Pasqualucci, Sensors, Jan. 1991.

* cited by examiner

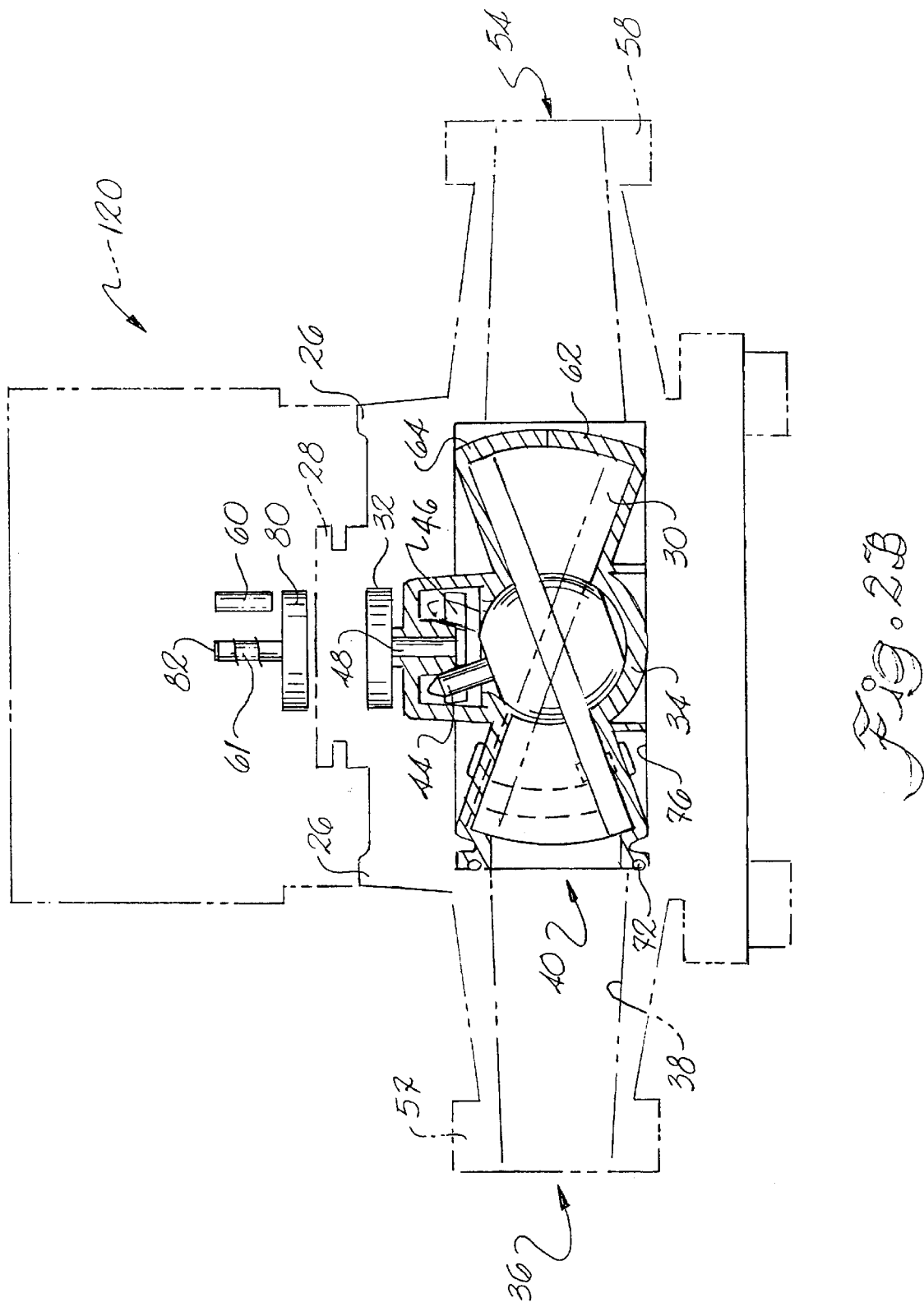

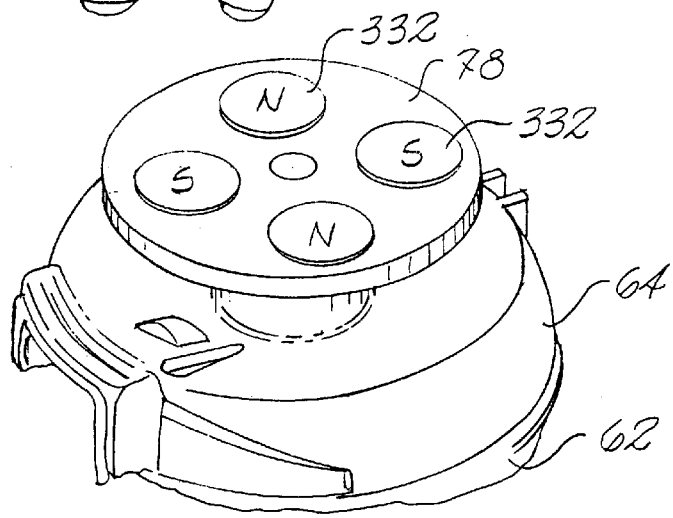
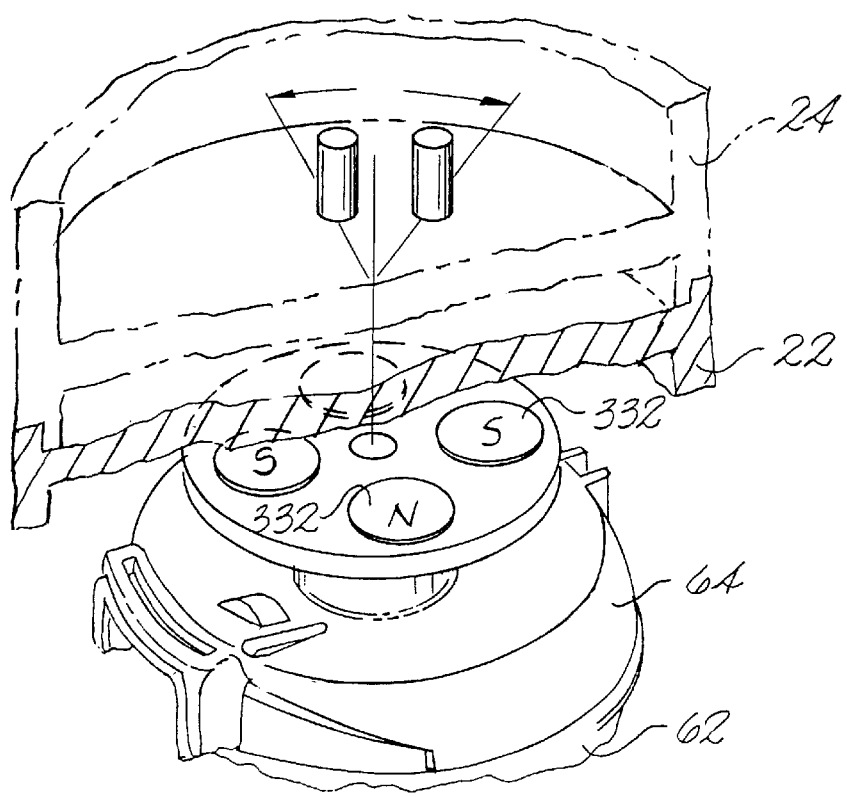

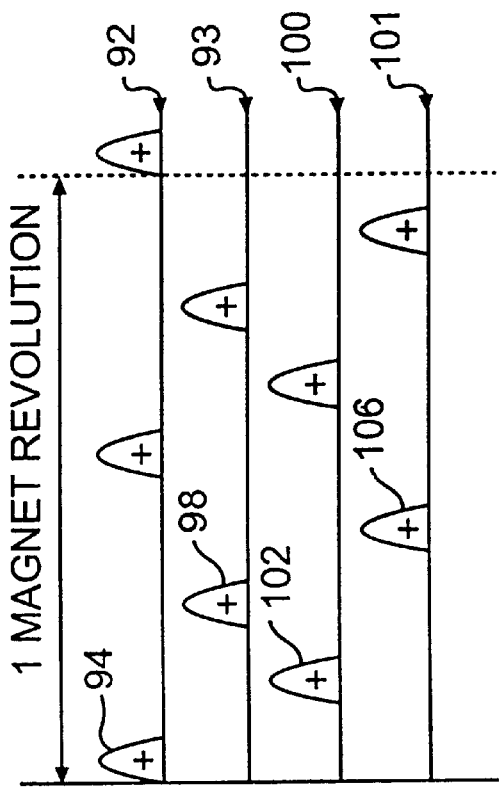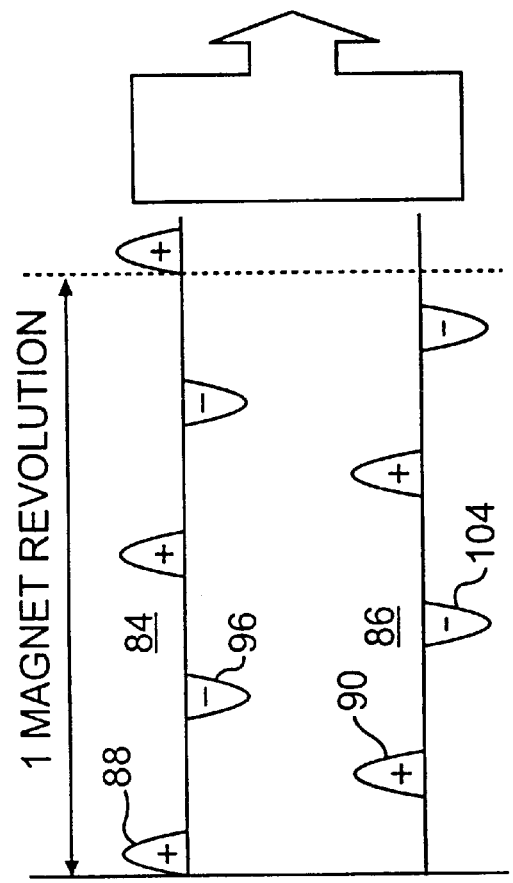
FIG. 11

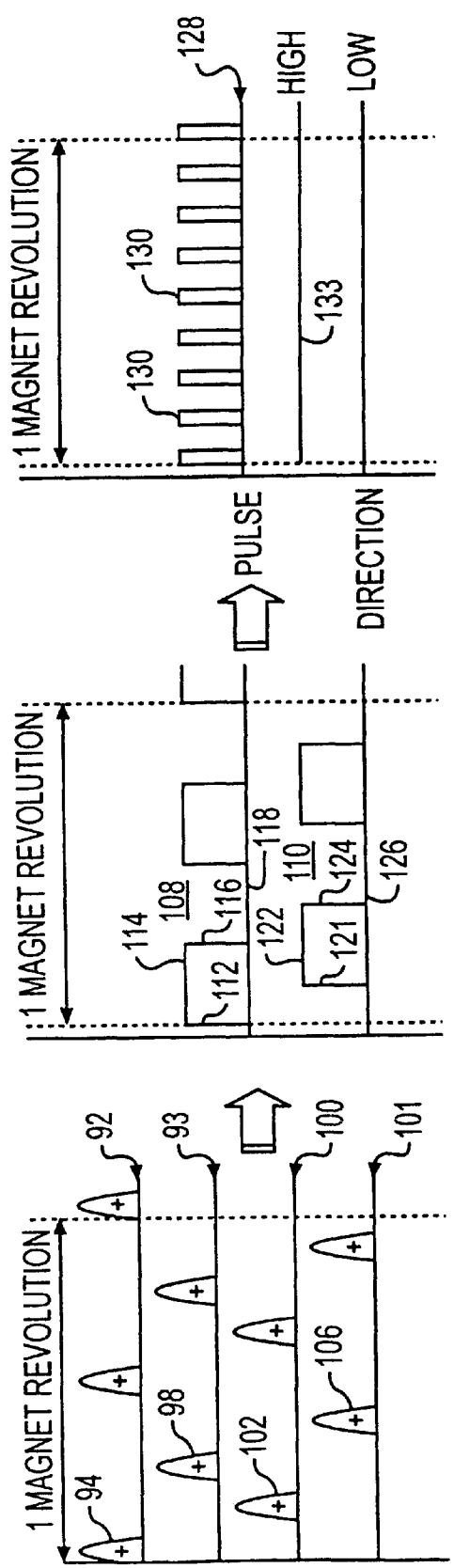

METHOD AND APPARATUS FOR DETERMINING THE DIRECTION AND RATE OF A ROTATING ELEMENT

FIELD OF THE INVENTION

The present invention relates to a method and apparatus for determining the direction or magnitude of rotation, or both, of a rotating magnetic field. More specifically, the present invention determines the direction of rotation of a rotating magnetic field by sensing the changes in polarity of magnetic flux occurring at two locations within the rotating magnetic field and comparing these changes to determine the direction of rotation. In addition, the rate or number of revolutions may also be measured. In one exemplary embodiment of the present invention, a fluid meter is provided that determines the magnitude and direction of a flowing fluid. The kinetic energy of the moving fluid is translated into a rotating magnetic field. Two sensors are placed within the magnetic field to determine the changes in magnetic flux polarity occurring at two different locations within the field. The direction of fluid flow is determined by comparing and interpreting the signals. The volume or rate of flow may also be determined.

BACKGROUND OF THE INVENTION

Conventional devices for fluid measurement are known. In general, such devices may be limited to measuring flow rates or may also be configured for totalizing the volume of fluid flow. While various devices and techniques for fluid measurement have been applied, many utilize a rotating element placed in the path of fluid flow. The kinetic energy of the moving fluid is harnessed to cause an element, such as a turbine, to rotate upon a shaft. Means are provided for detecting the rotational speed of the element and, in some devices, to determine the total number of revolutions. The volume of fluid displaced during one revolution is usually predetermined through calibration or calculations based upon the geometry of the rotatable element and the associated fluid passageway.

Various means exist for detecting the rotations of an element and converting the same into a recordable measurement. Such means include registers that are mechanically or magnetically coupled with the rotating element. U.S. Pat. No. 5,187,989, issued to Bulteau and commonly owned with the present application, discloses one example of an apparatus for detecting the rotation of the spinner of a water meter. In one embodiment, sensors in the form of oscillator circuits are disposed on two opposite radial directions about a disk. The disk is constructed of a non-metallic material but includes a metallized radial sector on the disk. As the disk rotates due to the flow of water through the meter, the oscillator circuits are used to detect the passage of the sector. The number of turns completed by the disk, and thus the flow of fluid through the meter, may then be totaled by associated circuitry to provide a measurement.

Sensors capable of detecting a changing magnetic field created from the rotation of a measuring element have also been applied. U.S. Pat. No. 4,579,008, issued to Bohm et al., discloses a flow meter that uses a plurality of sensors to detect the changing magnetic field created by placing a pair of magnets into the ends, respectively, of oval measuring gears. A plurality of sensing elements are required, and a nonuniform distribution of the sensors is utilized to compensate for the nonuniform rotation of the oval measuring gears.

U.S. Pat. No. 5,530,298, issued to Gerhold, discloses a natural gas volume meter. A magnetic sensor is located in close proximity to a magnet that is mounted upon a rotatable element in the gas meter. As the kinetic energy of the moving gas causes the element to rotate, a single magnet also rotates to create a magnetic field of changing flux. As only a single magnet is utilized, the resolution of this apparatus is limited to one change in magnetic flux, or signal, per each 180 degrees of revolution. Furthermore, specific physical configurations of the sensor and magnet are not taught.

The entire disclosures of the U.S. Patents noted above are herein incorporated by reference into the subject disclosure.

While the above referenced disclosures discuss means for detecting the rotation of an element for measuring the amount of flow, these references do not provide means for determining the direction of flow. In many applications, the ability to determine not only the amount or rate of flow but also the direction of flow would be advantageous.

SUMMARY OF THE INVENTION

The present invention provides for determining both the direction of rotation and magnitude of a rotating magnetic field. In application, the present invention provides for the measurement of certain physical events where the rotating magnetic field is generated in a known relationship to the event. The rotations of the magnetic field, for example, may be created by translating the kinetic energy of a moving fluid. Knowing the volume of fluid displaced per rotation of the magnetic field, the present invention allows for the determination of both the direction of flow and magnitude (rate or volume) of flow.

The present invention provides numerous embodiments for determining the direction of rotation of a rotating magnetic field. Examples will now be provided; others will be apparent to those of ordinary skill in the art using the techniques disclosed herein. In one exemplary embodiment, a method of determining the direction of rotation of a magnetic field includes sensing the change in polarity of magnetic flux encountered at a first point and at a second point located within a rotating magnetic field. The second point is located within the magnetic field at a position that is subsequent in the direction of rotation from the location of the first point. For example, if the magnetic field is rotating counter-clockwise, a change in magnetic flux encountered at the first point would be detected subsequent in time at the second point. In the event the direction of rotation changes from counter-clockwise to clockwise, the change in polarity of magnetic flux encountered at the second point would then be detected subsequent in time at the first point. By comparing the changes in polarity of magnetic flux detected at the first point and the second point, the direction of rotation of the rotating magnetic field may be determined.

Stated alternatively, the first point and second point are located at an angle, or subsequent in the direction of rotation, from one another. For example, assume a first plane is defined by the plane that is coincident with the axis of the rotating magnetic field and the location of the first point. Accordingly, the second point is located within a second plane that is coincident with the axis about which the magnetic field is rotating and positioned such that the second plane and first plane form a positive angle from each other. By way of example only, the angle between the first plane and second plane may be 45 degrees or multiples thereof such as 135, 225, and 315 degrees. Importantly, the angle between the first plane and second plane should be greater than 0 degrees. Otherwise, the change in magnetic flux polarity being detected at the first point and second point will be identical and thereby preclude a determination of the direction of rotation.

The rotating magnetic field may be created by the rotation of a magnet mechanically coupled with a measuring element located in the path of a flowing fluid. By way of example only, the rotating magnet may be connected to a turbine or nutating disk within a fluid meter. Water flowing through the meter causes the magnet to rotate by acting upon the turbine. The magnet may be configured from a variety of shapes. For example, the magnet may be cylindrical in shape and contain four quadrants of polarity within the cylindrical shape.

In another exemplary embodiment, the present invention provides a method of sensing the rotation and direction of a rotating magnetic field as follows. Within the rotating magnetic field, the changes in polarity of magnetic flux are detected at a first point. These changes are used to create a corresponding first stream of electrical pulses that alternate in polarity. The alternations in polarity correspond to the changes in polarity in magnetic flux detected at the first point. The changes in polarity of magnetic flux occurring within the rotating magnetic field are also detected at a second point. The second point is located at a position that is subsequent in the direction of rotation from the first point. A second stream of electrical pulses is created that corresponds to the changes in polarity of magnetic flux detected at the second point. The first and second stream of electrical pulses are each converted, respectively, into a first and a second alternating high and low signal. The alternating high and low signals are then decoded to determine the number of rotations and direction of the rotating magnetic field. As stated, the present invention requires that the second point is located subsequent in the direction of rotation from the first point. This limitation ensures that the first and second points are located relative to each other such that a given change in polarity of magnetic flux does not occur at said first point and said second point at exactly the same time.

In another exemplary embodiment, the present invention includes generating a first series of alternating electrical signals that are in sequence with the alternating changes in magnetic flux polarity occurring at a first position located within a rotating magnetic field. The first series of alternating electrical signals are created as the changes in magnetic flux polarity occur and alternate in polarity with the changes in magnetic flux. Simultaneously, a second series of alternating electrical signals are generated that are in sequence with the alternating changes in magnetic flux polarity occurring at a second position located within the rotating magnetic field. The second series of signals are generated as the changes in magnetic flux polarity occur and the signals are of alternating polarity. The second position is located subsequent in the direction of rotation from the first position such that a given change in magnetic flux polarity does not occur at the first position and the second position at the same time. The resulting first and second signal are combined to create a first output indicating the amount of rotation of the magnetic field and a second output indicating the direction of rotation of the rotating magnetic field.

The step of combining the first signal and second signal may be accomplished by converting the first series of alternating electrical signals into a first pulse train of positive pulses and converting the second series of alternating electrical signals into a second pulse train of positive pulses. The first pulse train is translated into a first channel of alternating high and low output that is in sequence with the positive pulses of the first pulse train. The second pulse train is also translated into a second channel of alternating high and low output that is in sequence with the positive pulses of the second pulse train. By decoding the first and second channels of alternating high and low output, the direction and amount of rotation of the rotating magnetic field may be determined and provided as a first and second output, respectively.

In another exemplary embodiment, the present invention provides a fluid meter for determining the rate and direction of fluid flow. A magnet is provided that is rotatable about an axis. During rotations, the magnet is configured such that a field of changing magnetic flux polarity is created. The rotation of the magnet is created by having the magnet in mechanical communication with a measuring element. Upon being placed into the path of fluid flow, the measuring element is configured such that it will translate the kinetic energy of the moving fluid so as to cause the magnet to rotate about its axis.

Within the field of changing magnetic flux polarity created by the magnet, a first sensor is located and is configured for detecting the changes in magnetic flux polarity. The first sensor provides a first series of signals that represent the changes in magnetic flux polarity being detected by the first sensor. The first sensor is physically located within a first plane that is coincident with the axis about which the magnet rotates.

A second sensor is also placed within the field of changing magnetic flux polarity created by the rotating magnet. The sensor is configured for detecting the changes in magnetic flux polarity and providing a corresponding second series of signals that represents the changes in magnetic flux polarity. The second sensor is located with a plane that is coincident with the axis about which the magnet rotates. The first plane described above and the second plane form an angle with each other that is greater than 0 degrees. Means are provided and configured for receiving and interpreting the first and second series of signals so as to determine both the direction and amount of fluid flow.

The means for receiving and interpreting the first and second series of signals may include a first rectifier that receives the first series of signals ands converts the same into a first pulse train and a second pulse train of positive pulses, which collectively represent the first series of signals. A second rectifier receives the second series of signals and similarly converts the second series of signals into a third and a fourth pulse train of positive pulses which represent the second series of signals. A first translator is provided that includes circuitry for receiving both the first and second pulse train and translating the same into a first channel of alternating high and low signals which represent and correspond to said first and second pulse train. A second translator is provided that includes circuitry for receiving the third and fourth pulse train and translating the same into a second channel of alternating high and low signals which represent and correspond to the third and fourth pulse train. Decoding circuitry receives the first and second channel of alternating high and low signals and determines the direction and amount of fluid flow by decoding the first and second channel.

In another exemplary embodiment of the present invention, a device is provided for measuring fluid flow. The device includes a first chamber that defines both a fluid inlet and a fluid outlet. A measuring element is configured within the first chamber such that when a fluid passes through the first chamber it causes the measuring element to rotate. The measuring element is in mechanical communication with a magnet having a centerline. As the measuring element rotates, it causes the magnet to also rotate about its centerline. A second chamber is attached to the first chamber. The attachment may be permanent or may be interchangeable. Within the second chamber, a first sensor is positioned such that the first sensor is within the field of magnetic flux of said magnet. Accordingly, upon said magnet rotating with the measuring element, the first sensor detects the resulting changes in polarity of magnetic flux occurring at the position of the first sensor. The first sensor provides a first series of alternating electrical pulses that correspond to the changes in polarity of magnetic flux detected by the first sensor. A second sensor is also positioned within the second chamber. The second sensor is located or positioned relative to the first sensor such that the second sensor does not simultaneously detect the same change in magnetic flux being detected by the first sensor. Upon the magnet rotating, the second sensor detects the resulting changes in polarity of magnetic flux occurring at the location of the second sensor and provides a second series of alternating electrical pulses that correspond to the changes in polarity being detected. Means are provided for receiving and interpreting the first and second series of electrical pulses so as to determine the direction and magnitude of fluid flow.

The means for determining the direction and magnitude of fluid flow may include a first circuit for transposing the first series of alternating electrical pulses into a first pulse train of positive pulses and a second pulse train of positive pulses both of which correspond to the first series of alternating electrical pulses. A second circuit transposes the second series of alternating electrical pulses into a third and fourth pulse train of positive pulses which correspond to the second series of alternating electrical pulses. A third circuit converts the first and second pulse train into a first channel of alternating high and low states that represents the first and second pulse train. A fourth circuit converts the third and fourth pulse train into a second channel of alternating high and low states representing the third and fourth pulse train. A fifth circuit receives the first and second channel and determines the direction and magnitude of flow from the information received from the first and second channel.

In another exemplary embodiment, the present invention includes a housing that defines a fluid inlet and a fluid outlet. A magnet, rotatable about an axis, is located within the housing. Means are provided for causing the magnet to rotate about the axis as a fluid flows through the housing. Within the field of magnetic flux of the magnet, a first magnetic flux sensor is positioned. The first magnetic flux sensor is located within a first plane that is coincident with the axis about which the magnet rotates. A second magnetic flux sensor is also positioned within the field of magnetic flux of the magnet. The second magnetic flux sensor is located within a second plane coincident with the axis about which the magnet rotates. The first plane and second plane form an angle that is greater than 0 degrees so that the first and second magnetic flux sensors do not simultaneously detect the same change in magnetic flux polarity caused by the rotation of the magnet. In communication with the first and second magnetic flux sensors, circuitry is provided and configured such that the magnitude of rotation and direction of rotation of the magnet may be determined. The magnet may assume a variety of shapes. For example, the magnet may be cylindrically shaped and include four quadrants of polarity.

In still another exemplary embodiment of the present invention, a first chamber is provided and defines a fluid inlet and fluid outlet. Within the first chamber a rotatable magnetic member is configured such that when a fluid passes through the first chamber the member is caused to rotate about an axis. A second chamber is attached to the first chamber. The second chamber may be permanently attached or may be interchangeable. A first magnetic flux sensor is positioned within the second chamber and is configured for sensing and detecting the changes in polarity of magnetic flux generated by the rotation of the magnetic member. The first magnetic flux sensor is located within a first plane that is coincident with the axis about which the magnetic member is rotatable. A second flux sensor is also positioned within the second chamber and is configured for sensing and detecting the changes in polarity of magnetic flux generated by the rotation of the magnetic member. The second magnetic flux sensor is located within a second plane that is coincident with the axis about which the magnetic member is rotatable. The first plane and second plane form an angle greater than 0 degrees. This angle ensures that the first and second magnetic flux sensor do not simultaneously detect the same change in magnetic flux polarity caused by the rotations of the magnetic member. Circuitry is provided in communication with said first and second magnetic flux sensors. The circuitry is configured such that the magnitude of rotation or direction of rotation, or both, of the rotatable magnetic member may be determined.

Finally, in still another exemplary embodiment of the present invention, a first housing is provided that defines a fluid inlet and a fluid outlet. A first magnet is configured within the first housing such that a fluid passing through the first housing causes the first magnet to rotate. A second housing is attached to the first housing. The second housing may be permanently attached or may be interchangeable. Within the second housing a second magnet is located and configured such that it is in magnetic communication with the first magnet. Accordingly, upon said first magnet rotating, said second magnet rotates about an axis. A first magnetic flux sensor is positioned within the second housing and is configured for detecting the changes in polarity of magnetic flux generated upon the rotation of said second magnet about its axis. The first magnetic flux sensor is located within a first plane that is coincident with the axis about which said second magnet rotates. The second magnetic flux sensor is also positioned within the second housing and is configured for detecting the changes in magnetic flux polarity occurring upon the rotation of said second magnet about its axis. The second magnet is located within a second plane that is also coincident with the axis about which the second magnet rotates. The first plane and the second plane form an angle greater than 0 degrees. Circuitry is provided that is in communication with the first and second magnetic flux sensors and is configured such that the magnitude of rotation and direction of rotation may be determined.

As above described, each embodiment of the invention requires that the changes in magnetic flux polarity created by a rotating magnetic field be sensed or detected at two positions within the field. Any sensor capable of detecting a change in magnetic field may be used. By way of example only, one type of sensor that may be used to detect changes in magnetic flux polarity is disclosed in U.S. Pat. No. 3,820,090 issued to Wiegand. This reference discloses a magnetic sensor that may be formed by cold working a wire constructed from iron, cobalt, and vanadium. When placed in the presence of a changing magnetic field, the wire will produce an electrical pulse that may be detected by appropriate circuitry. Alternatively, when placed in the presence of a changing magnetic field, the wire will also induce a voltage across a coil located near the wire. This resulting signal may be also captured by appropriate circuitry. The entire disclosure of U.S. Pat. No. 3,820,090 is incorporated herein by reference.

It is to be understood that exemplary embodiments of the subject invention equally involve methodology as well as apparatus disclosed herewith.

Additional objects and advantages of the invention are set forth, or will be apparent to, those of ordinary skill in the art from the detailed description as follows. Also it should be further appreciated that modifications and variations to the specifically illustrated and discussed features and materials hereof may be practiced in various embodiments and uses of this invention without departing from the spirit and scope thereof, by virtue of present reference thereto. Such variations may include, but are not limited to, substitutions of the equivalent means, features, steps, and materials for those shown or discussed, and the functional or positional reversal of various parts, features, steps, or the like.

These and other features, aspects, and advantages of the present invention will become better understood with reference to the following description and appended claims. The accompanying drawings, which are incorporated in and constitute a part of this specification, illustrate an embodiment of the present invention and, together with the description, serve to explain the principles and objectives of the invention.

BRIEF DESCRIPTION OF THE DRAWINGS

FIG. 2B is an alternate embodiment of the present invention.

FIG. 6 is a perspective view of another magnet configuration which may be used in an embodiment of the present invention.

FIG. 7 is a perspective and partial cross-sectional view of an embodiment of the present invention.

FIG. 11 is a schematic representation of the conversion of signals received from exemplary magnetic sensors.

FIG. 12A through 12C are schematic representations of the conversion of positive pulses to an output of rotational magnitude and direction.

DETAILED DESCRIPTION OF THE PREFERRED EMBODIMENTS

Figure 1:
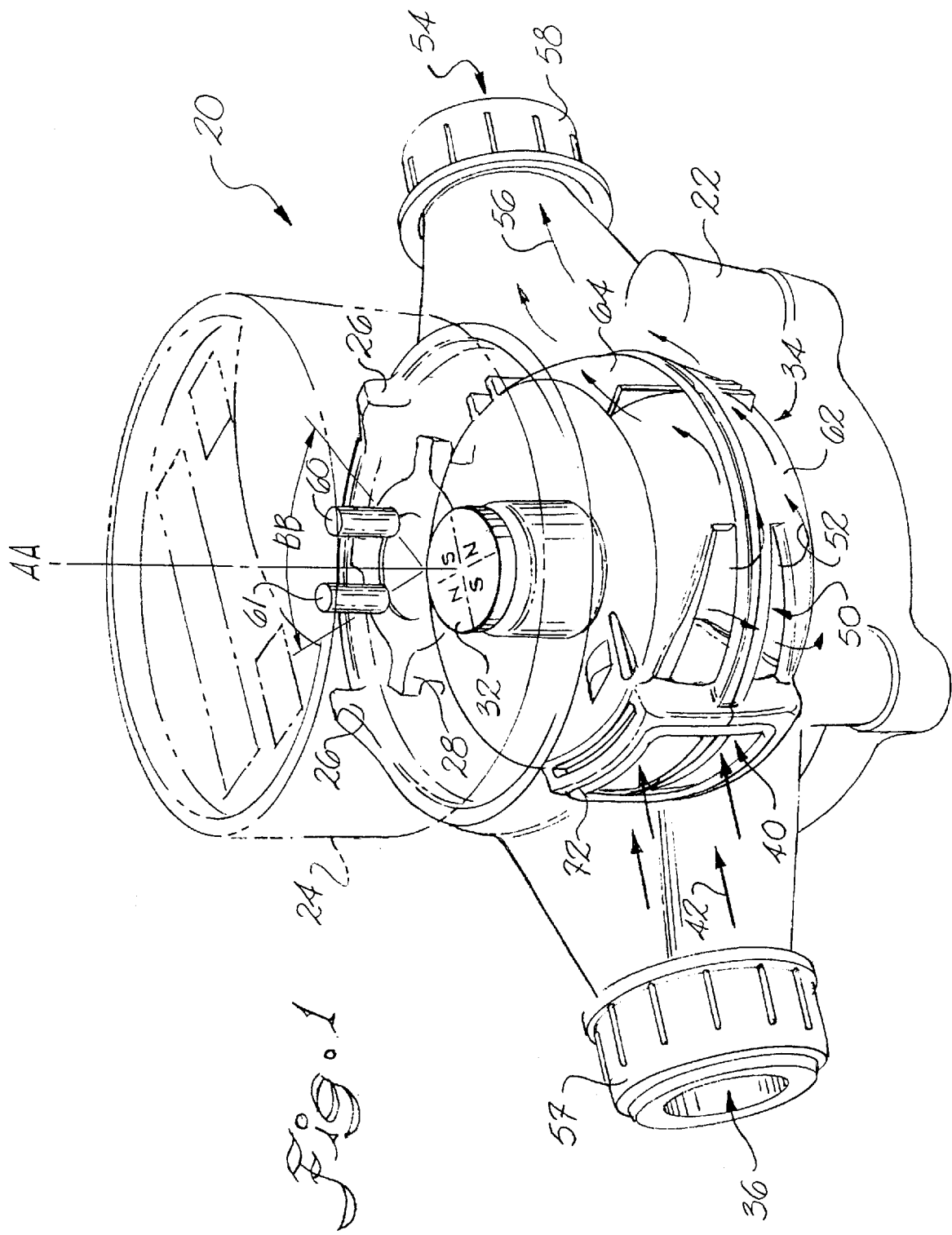
FIG. 1 is a perspective and partial cross-sectional view of an exemplary embodiment of the invention configured within an exemplary fluid meter.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

The present invention relates to a method and apparatus for determining the direction of rotation of a rotating element as well as magnitude (rate or amount) of rotation of the element. More specifically, the present invention detects the changes in magnetic flux polarity created within a rotating magnetic field. By detecting the changes in magnetic flux polarity occurring at two different locations within the rotating magnetic field and comparing the changes so detected, the direction and magnitude of rotation may be determined.

The present invention may be applied to the measurement of fluid flow so as to provide not only an indication of the magnitude of fluid flow but also the direction in which the fluid is flowing. By way of example, the present invention provides an apparatus or device that translates the kinetic energy of a moving fluid into a rotating magnetic field. The rotating field may be created by coupling a magnet with an element that rotates upon being placed in the path of fluid flow. Two sensors placed at different locations within the rotating magnetic field detect the changes in magnetic flux polarity occurring at the two locations. By comparing these detected changes, and knowing the amount of fluid displaced by one rotation of the element, the direction of flow, volume of flow, and rate of flow may be determined.

Figure 2A:
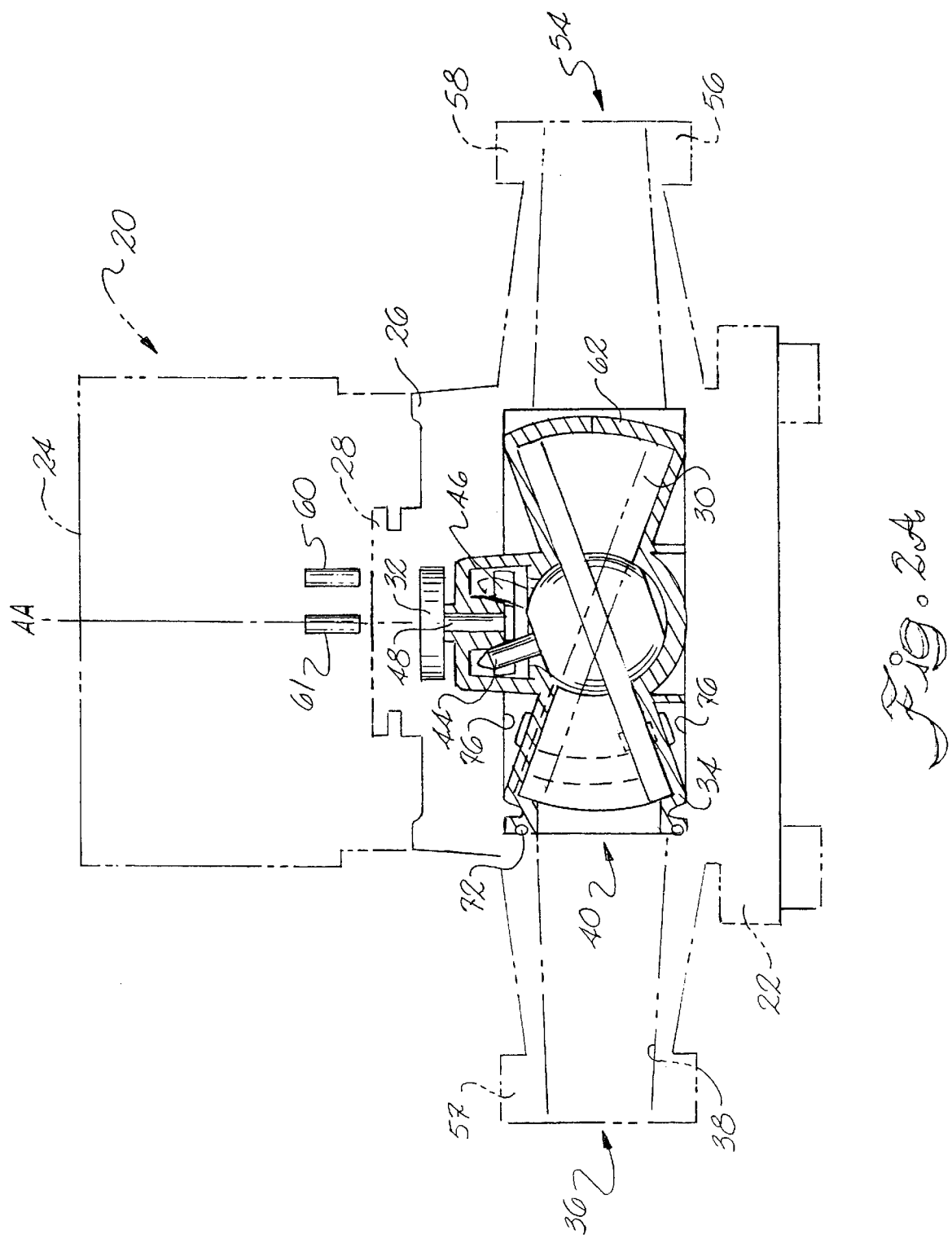
FIG. 2A is a cross-sectional view of the embodiment depicted in FIG. 1.

FIG. 1 and FIG. 2A depict an exemplary embodiment of the present invention in which a fluid meter 20 is used to measure the direction and magnitude of fluid flow. The fluid meter 20 is but one example of the use of the invention and other fluid meters of different configuration and operation may be envisioned using the teachings disclosed herein. Furthermore, the present invention is not limited to fluid meters.

Fluid meter 20 includes a first chamber 22 detachably connected to a second chamber 24. A plurality of tabs 26 and a locking boss 28 are used to detachably secure the first chamber 22 to the second chamber 24. Detachability allows for the second chamber 24 to be readily substituted during the life of the fluid meter 20 and thereby facilitates replacement or changes in features. For example, the second chamber 24 may provide a housing or interior for including a register to provide mechanical recording and display of fluid measurements. Alternatively, the second chamber 24 may be substituted so as to include a register having solid state electronics for recording and reporting fluid measurements. Detachability is not required by the present invention; the first chamber 22 and second chamber 24 may also be permanently connected.

The first chamber 22 provides a housing or interior for a measuring element 30 that converts the kinetic energy of a moving fluid into a measurable rotation or other measurable movement. By nutating about axis AA, the measuring element 30 translates the kinetic energy of a fluid flowing through the meter 24 into the rotation of a meter magnet 32, as will be more fully described below. However, the present invention is not limited to the particular measuring element 30 depicted in FIG. 1 and FIG.2A, and may include any mechanism that can translate the kinetic energy of a flowing fluid into a measurable movement. By way of example only, the measuring element 30 may also be constructed from other rotatable members, such as a turbine, rotor, disk, or other such mechanisms. For the embodiment shown in FIG. 1 and FIG. 2A, the measuring element 30 is encased within a cartridge 34, the details of which will be described more fully below.

In operation, fluid enters first chamber 24 through a fluid inlet or ingress 36.

Fluid then travels along a conduit 38 and enters the cartridge 34 through a cartridge inlet 40 as indicated by the flow arrows 42. Within the cartridge 34, the fluid acts upon the measuring element 30. The measuring element 30 then converts the kinetic energy of the moving fluid into a measurable movement by nutating, or oscillating, about axis AA. A shaft 44, connected to measuring element 30, then acts upon a spindle 46 so as to cause the meter magnet 32 to rotate about axis AA on a magnet shaft 48. Flow then exits cartridge 34 through a cartridge outlet 50 as indicated by flow arrows 52. Fluid then exits first chamber 22 through a fluid outlet or egress 54 as shown by flow arrows 56.

The fluid meter 20 may be connected into the path of fluid flow at fluid inlet 36 and fluid outlet 54. This connection may be permanent or resealable. Any suitable connections known in the art may be used. For example, the embodiment shown in FIG. 1 and FIG. 2A uses resealable, threaded connectors 57 and 58. The first chamber 22, measuring element 30, and cartridge 34 may be constructed from any number of materials suitable for contact with the fluid to be measured. By way of example only, these materials may include bronze, plastics, iron, copper, and various other materials.

A first sensor 60 is configured or placed within the second chamber 24 to detect the changing fields of magnetic flux polarity created by the rotations of the meter magnet 32. The first sensor 60 is located within a first plane that is coincident with axis AA. A second sensor 61 is also configured or located within the second chamber 24 to detect the changing fields of magnetic flux polarity created by the rotations of the meter magnet 32. The second sensor 61 lies within a second plane that is coincident with the axis AA. The angle BB between the first plane and the second plane is any angle greater than 0. This requirement for angle BB ensures that the change in magnetic flux polarity sensed or detected by the first sensor 60 is not simultaneously detected by the second sensor 61. Stated alternatively, in order for the direction or rotation to be determined, the first plane and the second plane must not be coplanar or identical.

Any pair of sensors 60 and 61 capable of detecting changes in magnetic flux polarity may be utilized. One such particular sensor that may be applied is referred to generally as a "Wiegand" wire. As described more fully in U.S. Pat. No. 3,820,090, issued to Wiegand, this magnetic sensor is constructed from a bistable ferromagnetic wire having a core portion and a shell portion. The shell surrounding the core has a relatively high coercivity; while the core of the Wiegand wire has a relatively low coercivity. As set forth in U.S. Pat. No. 3,820,090, which is incorporated herein by reference, the wire may be constructed from an alloy having 48% iron and 52% nickel, or vicalloy (iron, cobalt, and vanadium). Through processing, the Wiegard wire is formed to have a core and shell as described.

When removed from the presence of an external field, the higher coercivity shell acts upon the core of the Wiegand wire to cause a magnetization of the core in a direction opposite to the magnetization of the shell. Upon placing the Wiegand wire into an external field, this effect may be overcome so as to cause the magnetization of the core to switch. The reversal of magnetization will generate an electrical pulse in a coil placed near the Wiegand wire. For simplicity, the embodiment depicted in FIG. 1 simply shows the sensor 60 without such "pick-up" coil or associated circuitry for detecting the electrical pulse generated in the pick-up coil. Alternatively, appropriate circuitry may be directly connected to the Wiegand wire to detect an electrical pulse that will be generated within the Wiegand wire when the magnetization of the core switches.

In operation, as shown in FIG. 1, a fluid acting upon the measuring element 30 in cartridge 34 causes the meter magnet 32 to rotate about axis AA. As meter magnet 32 rotates, the sensors 60 and 61 are subjected to a field of changing magnetic flux polarity. By way of example only, the meter magnet 32 shown in FIG. 1 is divided into four quadrants of polarity. A complete revolution of meter magnet 32 thereby creates four changes in magnetic flux polarity that are detected by each of the sensors 60 and 61. These four changes may then be recorded and decoded by appropriate circuitry, as will be discussed below, to determine the direction of rotation or amount of rotation, or both. For example, where the sensors 60 and 61 are Wiegand wires, the four electrical pulses created by each of the Wiegand wires (or created in a pick-up coil placed near the Wiegand wires) may be received and decoded by appropriate circuitry in communication with the Wiegand wires (or pick-up coils). In addition, by predetermining the volume of fluid that passes through the meter 20 during one revolution of the meter magnet 32, the rate of fluid flow or amount of fluid flow may be calculated from the number of changes in magnetic flux polarity detected by either of the sensors 60 and 61. A register, constructed in part with such circuitry, may be located within the second chamber 24 to perform the decoding or calculations and display, store, or transmit the corresponding results.

Figure 3:
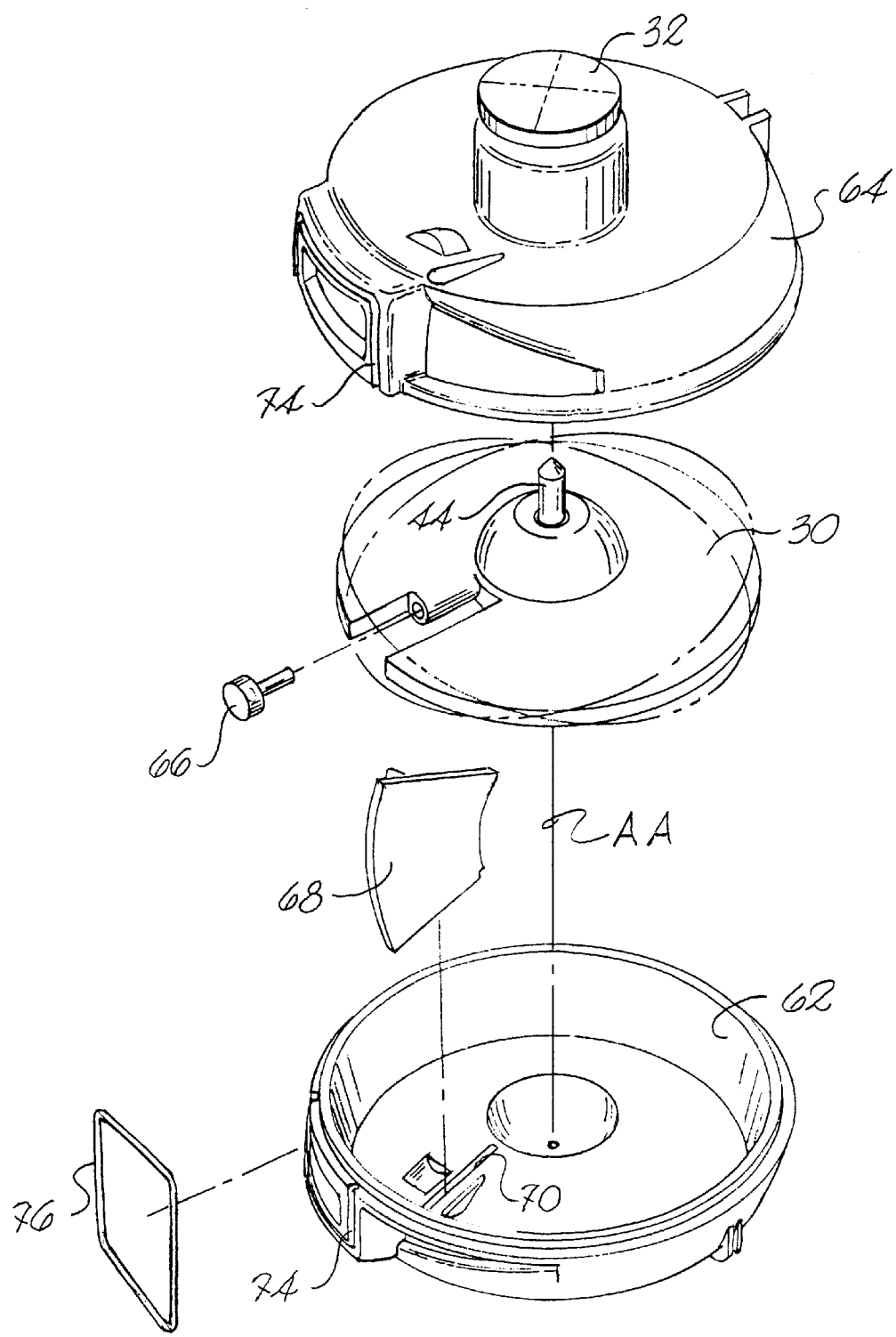
FIG. 3 is an exploded, perspective view depicting an exemplary configuration of the measuring element.

As indicated above with regard to FIG. 2A, a fluid flowing through the first chamber 22 causes the measuring element 30 to nutate about axis AA. As shown in FIG. 3, the cartridge 34 includes a base 62 and a cap 64. Enclosed within cartridge 34 is the measuring element 30 having the shaft 44. Attached to the measuring element 30 is an aligning wheel 66. As fluid flows through cartridge 34, measuring element 30 oscillates about axis AA, and the aligning wheel 66 rides up and down along a partition 68.

Figure 4:
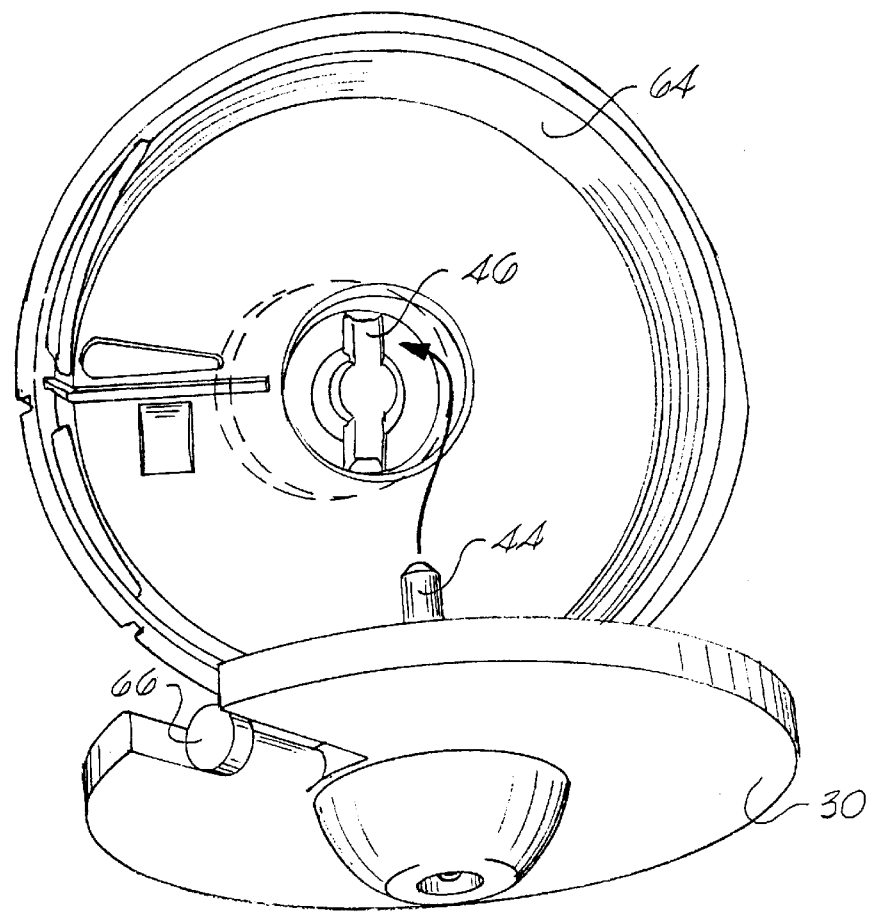
FIG. 4 is a perspective view of certain components depicted in FIG. 3.

Partition 68 is fixed in place in part by a recess 70 in the base 62. During the oscillations or nutations, shaft 44 rotates about axis AA causing meter magnet 32 to rotate. As shown in FIG. 4, shaft 44 acts upon the spindle 46, which in turn is in mechanical communication with the meter magnet 32. The entire assembly shown in FIG. 3 and FIG. 4, comprising the cartridge 34, is located within first chamber 22 as shown in FIG. 1 and FIG. 2A. A seal 72 placed within a seat 74 formed in the base 62 and the cap 64 ensures a fluid seal between cartridge 34 and the internal wall 76 of first chamber 22.

Figure 5A:
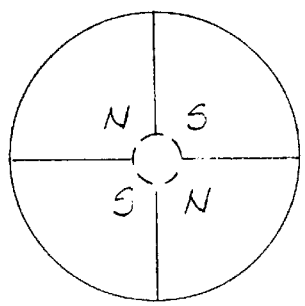
FIG. 5A through 5C depict examples of meter magnets that may be utilized with embodiments of the present invention.
Figure 5B:
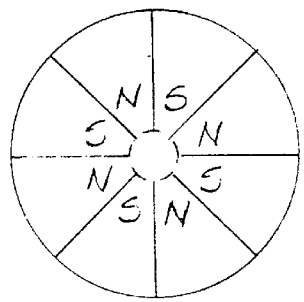
Figure 5C:
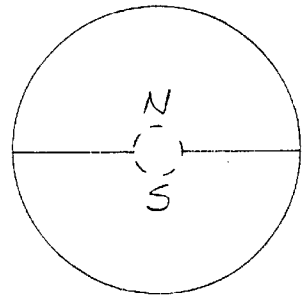

Referring to FIG. 5A through FIG. 5C, meter magnet 32 may be constructed to have a plurality of poles. Increasing the numbers of poles within meter magnet 32 increases the resolution capability of fluid meter 20 by providing more changes in magnetic flux for a given revolution of measuring element 30. By way of example only, the meter magnet 32 shown in FIG. 5A would provide four signals in one sensor during one revolution. Similarly, the meter magnet 132 shown in FIG. 5B would provide eight signals for one sensor during one revolution. Finally, the magnet 232 shown in FIG. 5C would provide only two signals per sensor during one revolution.

FIG. 6 shows elements of another embodiment of the present invention in which a plurality of meter magnets 332 are attached to a rotating platform 78. (The repeat use of reference characters in this disclosure is intended to mean the same or analogous element). As a fluid acts upon measuring element 30, shaft 44 contacts spindle 46 and thereby causes the platform 78 to rotate. As shown in FIG. 7, the cartridge 34 is located within first chamber 22. Sensors 60 and 61 are located within the second chamber 24. As platform 78 rotates due to the flow of fluid through cartridge 34, the sensors 60 and 61 detect the resulting changes in magnetic flux polarity that are transferred through the walls of the first chamber 22 and the second chamber 24.

While FIG. 6 and FIG. 7 depict the use of four magnets 332, this embodiment of the present invention is not limited to this specific configuration. For example, numerous separate magnets 332 may be spaced about platform 78. Preferably, the magnets 332 should be oriented along the platform 78 so that during rotations the sensors 60 and 61 are subjected to changing fields of magnetic flux. Accordingly, the magnets 332 should be positioned along the platform 78 so that at least one change in magnetic flux polarity may be detected by each sensor 60 and 61 as a result of the rotation of platform 68. For those embodiments where the sensors are Wiegand wires, it is conceivable that only one polarity may be used. For example, two magnets may be located along the platform 78 so that sensor 60 and sensor 61 are subjected to a pulsing magnetic flux of the same polarity during the rotation of platform 78.

Other embodiments of the present invention may be envisioned using the teachings disclosed herein. By way of example only, FIG. 2B shows another embodiment 120 of the present invention where a register magnet 80 is located within the second chamber 24. The register magnet 80 is magnetically coupled to the meter magnet 32 due to the magnetic forces of the magnets transmitted through the walls of first chamber 22 and second chamber 24. During operation, fluid acts upon the measuring element 30 causing the shaft 44 to drive the spindle 46. In turn, the meter magnet 32 rotates so as to cause the register magnet 80 to rotate about a register magnet shaft 82. Sensors 60 and 61, located within second chamber 24, may then be located in proximity to register magnet 72. As a result, during the rotation of register magnet 72, the sensors 60 and 61 are subjected to changing fields of magnetic flux polarity. As shown is FIGS. 5A thru 5C, register magnet 72 may be constructed so as to subject sensors 60 and 61 to any number of changes in the field of magnetic flux during the rotation of register magnet 72.

In still another embodiment, cartridge 34 may include a rotating element that is inherently magnetic. For example, cartridge 34 may be a turbine, rotating disk, or nutating constructed in whole or part of magnetic material. Sensors 60 and 61 may then be positioned so that each are subjected to the changes in magnetic flux polarity caused by the rotation of such element.

Figure 8:
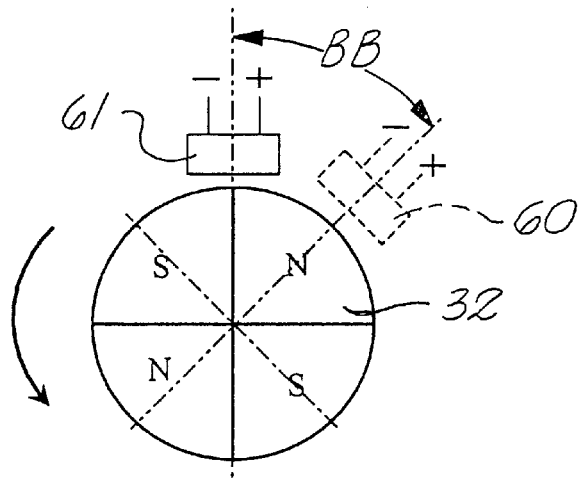
FIG. 8 is a schematic representation of an exemplary placement of the magnetic sensors.
Figure 9:
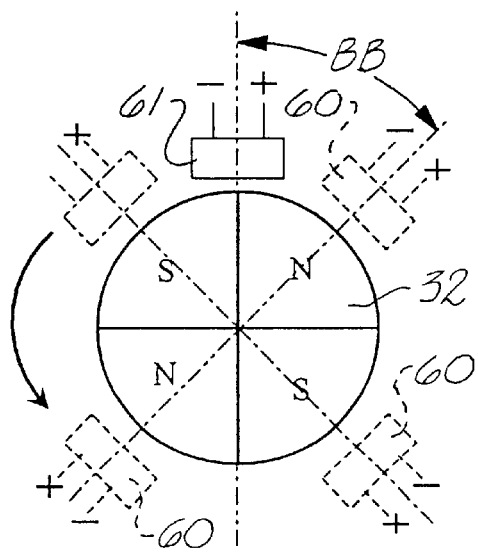
FIG. 9 is a schematic representation of exemplary placements of the magnetic sensors.

As described previously, sensors 60 and 61 are located relative to each other such that the same change in magnetic flux polarity is not detected by the sensors at the same time. As shown schematically in FIG. 8, the angle BB between the sensors 60 and 61 is some angle greater than zero. Sensor 60 is shown in phantom in FIG. 8 to emphasize that it may be placed at any number of positions relative to sensor 61, as shown in FIG. 9. Multiples of 45 degrees are used in FIG. 9 by way of example only.

Accordingly, referring to FIG. 9, if magnet 32 is rotating counter-clockwise, then a specific change in magnetic flux polarity is first detected by sensor 60 at a first position and then by sensor 61 at a second position. For example, a change in polarity from north to south is detected by sensor 60 and then by sensor 61 as the magnet 32 rotates counter-clockwise. If the magnet 32 reverses direction, the opposite occurs—sensor 61 becomes the first sensor to detect a given change in magnetic flux polarity followed by sensor 60.

A number of steps and corresponding circuits or means may be envisioned by one skilled in the art using the teachings disclosed herein for converting the changes in magnetic flux polarity detected by sensors 60 and 61 into an output of the direction of rotation and magnitude of rotation. The following discussion provides only one example; others may be envisioned using the teachings disclosed herein without departing from the spirit and scope of the present invention.

Figure 10:
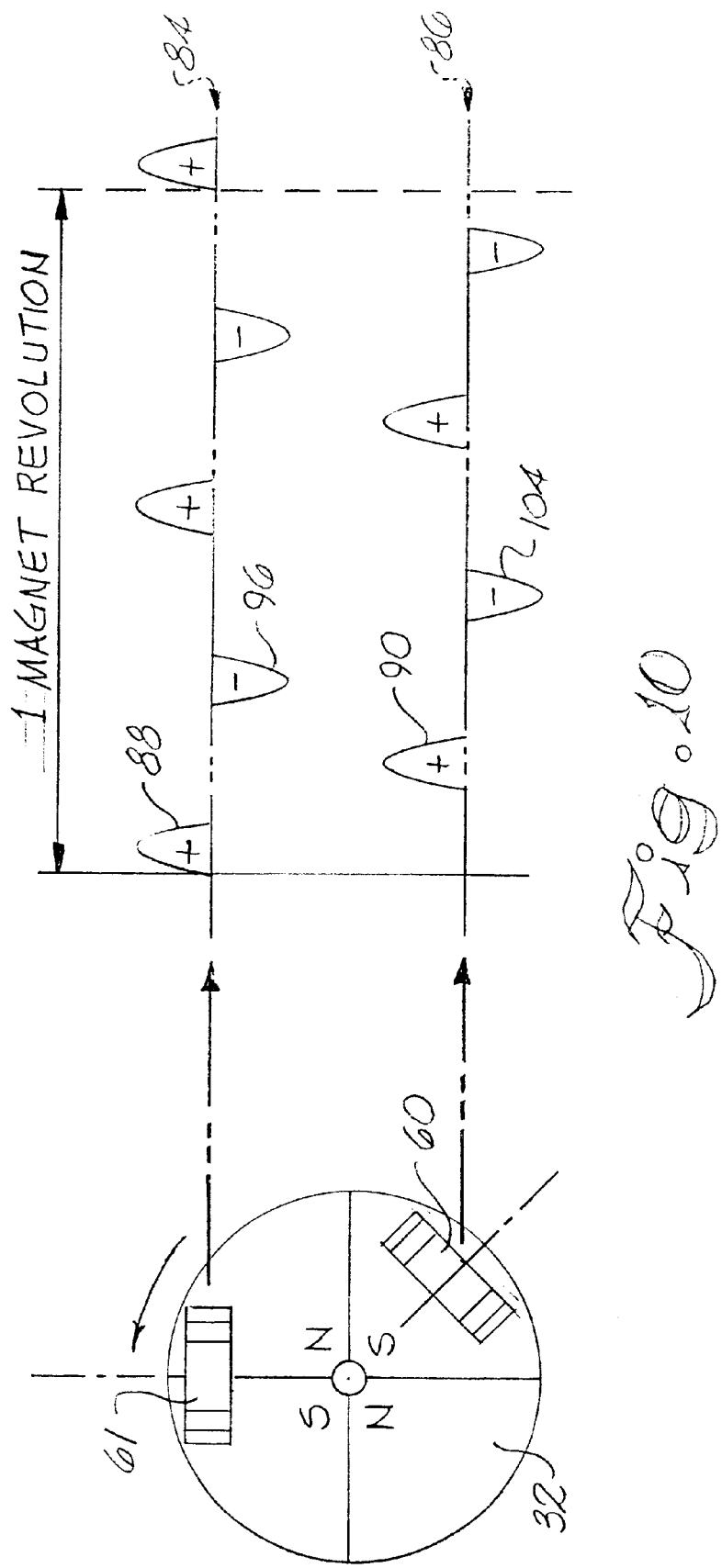
FIG. 10 is a symbolic representation of the signals received from exemplary magnetic sensors.

FIG. 10 is a schematic representation of the output that may be provided when Wiegand wires are used for sensors 60 and 61. As magnet 32 rotates counter-clockwise, sensor 61 detects the changes in magnetic flux polarity occurring at a first position within the magnetic field created by magnet 32. For each change in polarity encountered, the sensor 61 produces an electrical pulse that is either positive or negative depending upon whether the change in polarity is from north to south, or south to north. As magnet 32 continues to rotate, a first stream or first series of alternating electrical signals 84 is created or generated that is in sequence with the alternating changes in magnetic flux polarity occurring at the location of sensor 61.

Simultaneously therewith, as meter magnet 32 rotates counter-clockwise, sensor 60 detects the changes in magnetic flux polarity occurring at a second position within the magnetic field of magnet 32. For each change in polarity detected, sensor 60 produces an electrical pulse that is either positive or negative depending upon the change in polarity detected. As magnet 32 continues to rotate, a second stream or second series of alternating electrical signals 86 is created in sequence with the alternating changes in magnetic flux polarity occurring at the location of sensor 60.

The resulting series 84 and 86 are out of phase relative to each other due in part to the requirement that angle BB be greater than 0 degrees. Thus, if signal 88 represents a given change in polarity detected by sensor 61, then the same change in polarity subsequently detected by sensor 60 as meter magnet 32 rotates counter-clockwise is represented by signal 90. As depicted in FIG. 10 and above described, one revolution of meter magnet 32 produces four signals for each of sensor 60 or 61 where magnet 32 contains four poles.

Series 84 is then converted into a first pulse train 92 and a second pulse train 93 of all positive pulses as shown symbolically in FIG. 11. Accordingly, positive signal 88 is converted into positive pulse 94. Negative signal 96 is converted into positive pulse 98. Similarly, series 86 is converted into a third pulse train 100 and a fourth pulse train 101 of all positive pulses. Signal 90 becomes positive pulse 102 and signal 104 becomes positive pulse 106. In order to increase signal acquisition, the amplitude of the pulse trains 92 and 100 may be greater than the amplitude of series 84 and 86. For example, the amplitude of first pulse train 92 may be as high as five volts whereas the amplitude of series 84 may be measured in microvolts. The circuitry or other means for converting or rectifying series 84 and 96 into pulse trains 92, 93, 100, and 101 will be readily apparent to one of ordinary skill in the art. Furthermore, using the teachings disclosed herein, it will be apparent on one of ordinary skill in the art that pulse trains 92, 93, 100, and 101 may also be created without converting the negative signals into the positive pulses.

Pulse trains 92, 93, 100, and 101 may then be converted or translated into a first channel 108 and second channel 110 of alternating high and low states as shown in FIG. 12A and FIG. 12B. For example, pulse 94 initiates the leading edge 112 of high state 114. Pulse 98 initiates the trailing edge 116 of high state 114 and the beginning of low state 118. Similarly, pulse 102 initiates the leading edge 121 of high state 122. Pulse 106 initiates the trailing edge 124 of high state 122 and the beginning of low state 126. Circuitry or means for converting or translating pulse trains 92, 93, 100, and 101, into first channels 108 and 110 will be readily apparent to one of ordinary skill in the art. By way of example only, a conventional R-S flip-flop may be used to convert pulse trains 92, 93, 100, and 101 into first channel 108. As a further example, software may be used to convert pulse trains 92, 93, 100, and 101 into first channel 108.

For the purposes of determining the direction of rotation, the high and low states of channels 108 and 110 may be assigned the logical states of 1 and 0. For example, each high state of channel 108 becomes a 1 and each low state becomes a 0. The resulting series of logical states represented by the numbers 1 and 0 for both channels 108 and 110 provides what is referred to by those of ordinary skill in the art as a "quadrature signal". This signal may be readily decoded to determine the direction of rotation using a technique also familiar to those of ordinary skill in the art and referred to as "quadrature decoding." For example, if the logical states of channel 108 are viewed as the most significant bit of a two bit binary number, and the logical states of channel 110 are viewed as the least significant bit of a two bit binary number, the logical states represented by both channels can be converted into a series of decimal numbers. The result provides an indication of both the direction of rotation and an indication of when the direction of rotation changes. For example, rotation in the counter-clockwise direction can produce a series of decimal numbers such as . . . -2-3-1-0-2-3-1-0 . . . , whereas rotation in the opposite or clockwise direction would produce the series . . . -0-1-3-2-0-1-3-2- . . . If the previous number in the series is repeated, then the direction of rotation has changed. In addition, by counting the number of pulses, the number of revolutions of the meter magnet 32 may be readily determined knowing the physical configurations of the poles on the magnet. For example, a four pole magnet such as meter magnet 32 will produce four signals per sensor in one revolution as shown in FIG. 11. This corresponds to eight total pulses per revolution as shown in FIG. 12A.

Therefore, by determining the direction of rotation as above described and the number of pulses per revolution, a dual output may be provided as shown in FIG. 12C. First output 128 represents the combined pulses or signals from the sensors 60 and 61. Each count 130 represents one signal, such as signal 88 shown in FIG. 11, from a sensor 60 or 61. Because meter magnet 32 has four poles, eight counts 130 correspond to one revolution of meter magnet 32. Second output 133 represents the direction of rotation determined as above described. The high state for second output 133 represents rotation in one direction while the low state represents rotation in the opposite direction. Decoder devices, circuitry, or other means are commercially available for converting the series of signals 84 and 86 into first output 128 and second output 133 as shown in FIG. 12C. Using the teachings disclosed herein, it will be apparent to one of ordinary skill in the art that alternative outputs can be created to represent magnitude and direction of flow. By way of example only, the series of signals 84 and 86 could be converted into streams of either up or down count pulses to represent both the magnitude and direction of flow.

Returning now to FIG. 1 and FIG. 2A, by knowing the amount of water displaced by measuring element 30 during one revolution, the present invention provides for determining not only the magnitude of flow through fluid meter 20 (such as the rate, total volume, or both), but the direction of flow may also be determined. More specifically, in the event fluid begins to flow in reverse and into fluid meter 20 by entering fluid outlet 54, such action may be detected using the present invention. Fluid meter 20 may be equipped to continuously collect data regarding fluid flow and store the information for later retrieval or transmittal.

Thus, for fluid meter 20, numerous uses and advantages may be derived using the present invention. By way of example, fluid meter 20 may be installed to determine whether backflow is occurring. Where the fluid is water, fluid meter 20 may be used to determine if unwanted and potentially unsafe water is entering a drinking supply due to backflow in a particular distribution area. Such would allow municipal water suppliers to determine whether and where to install backflow preventers. Other applications will be apparent to those of ordinary skill in the art using the teachings disclosed herein.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part. Therefore, the spirit and scope of the appended claims should not be limited to the description of the preferred versions contained therein.

What is claimed is:

1. A method of determining the direction of rotation of a rotating magnetic field, comprising:

sensing the change in polarity of magnetic flux encountered at a first point located within the rotating magnetic field with a first bistable ferromagnetic wire that comprises a core and a shell, wherein the core has a higher coercivity than the shell;

sensing the change in polarity of magnetic flux encountered at a second point located within the rotating magnetic field with a second bistable ferromagnetic wire that comprises a core and a shell, wherein the core has a higher coercivity than the shell, wherein said second point is located at a position that is subsequent in the direction of rotation from said first point;

creating a first stream of signals corresponding to said change in polarity of magnetic flux at said first point;

creating a second stream of signals corresponding to said change in polarity of magnetic flux at said second point; and determining the direction of rotation of the magnetic field by comparing the change in polarity detected at said first point with the change in polarity detected at said second point.

2. A method of determining the direction of rotation of a rotating magnetic field as in claim 1, wherein
said first point is located within a first plane that is coincident with the axis about which said magnetic field is rotating;
said second point is located within a second plane that is coincident with the axis about which said magnetic field is rotating; and
said first plane and said second plane form an angle of about 45 degrees from each other.

3. A method for determining the direction of rotation of a rotating magnetic field as in claim 1, wherein the rotating magnetic field is created by a rotating magnet that is in mechanical communication with a rotating measuring element located in the path of a flowing fluid.

4. A method of determining the direction of rotation of a rotating magnetic field as in claim 3, wherein the rotating magnet is cylindrically shaped and contains four separated poles.

5. A method of sensing the rotation and direction of a rotating magnetic field, comprising:
detecting the changes in polarity of magnetic flux encountered at a first point located within the rotating magnetic field with a first bistable ferromagnetic wire that comprises a core and a shell, wherein the core has a higher coercivity than the shell;
creating a first stream of electrical pulses of alternating polarity corresponding to the changes in polarity of magnetic flux detected at said first point;
detecting the changes in polarity of magnetic flux encountered at a second point located within the rotating magnetic field with a second bistable ferromagnetic wire that comprises a core and a shell, wherein the core has a higher coercivity than the shell, wherein said second point is located at a position that is subsequent in the direction of rotation from said first point;
creating a second stream of electrical pulses of alternating polarity corresponding to the changes in polarity of magnetic flux detected at said second point;
converting said first stream of electrical pulses into a first alternating high and low signal;
converting said second stream of electrical pulses into a second alternating high and low signal; and
decoding said first and second alternating high and low signals to determine the number of rotations and direction of said rotating magnetic field.

6. A method of sensing the rotation and direction of a rotating magnetic field as in claim 5, wherein
said first point is located within a first plane that is coincident with the axis about which said magnetic field is rotating;
said second point is located within a second plane that is coincident with the axis about which said magnetic field is rotating; and
said first plane and said second plane form an angle of about 45 degrees from each other.

7. A method of sensing the rotation and direction of a rotating magnetic field as in claim 5, wherein the rotating magnetic field is created by a rotating magnet that is in mechanical communication with a rotating measuring element located in the path of a flowing fluid.

8. A method of sensing the rotation and direction of a rotating magnetic field as in claim 7, wherein the rotating magnet is cylindrically shaped and contains four separated poles.

9. A method of sensing the rotation and direction of a rotating magnetic field, comprising the steps of:
generating a first series of alternating electrical signals in sequence with the alternating changes in magnetic flux polarity occurring at a first position within said rotating magnetic field with a first bistable ferromagnetic wire that comprises a core and a shell, wherein the core has a higher coercivity than the shell, said first series of signals being generated as the changes in magnetic flux polarity occur and being of alternating polarity;
generating a second series of alternating electrical signals in sequence with the alternating changes in magnetic flux polarity occurring at a second position within said rotating magnetic field with a second bistable ferromagnetic wire that comprises a core and a shell, wherein the core has a higher coercivity than the shell, said second series of signals being generated as the changes in magnetic flux polarity occur and being of alternating polarity, said second position being located subsequent in the direction of rotation from said first position; and
combining said first signal and said second signal so as to create a first output indicating the amount of rotation of said magnetic field and a second output indicating the direction of rotation of said magnetic field.

10. A method as in claim 9, wherein the steps of combining of said first signal and said second signal comprises:
converting said first series of alternating electrical signals into a first pulse train of positive pulses;
converting said second series of alternating electrical signals into a second pulse train of positive pulses;
translating said first pulse train into a first channel of alternating high and low output, said first channel of alternating high and low output being in sequence with the positive pulses of said first pulse train;
translating said second pulse train into a second channel of alternating high and low output, said second channel of alternating high and low output being in sequence with the positive pulses of said second pulse train; and
decoding said first and second channels of alternating high and low output so as to create said first output indicating the amount of rotation of said magnetic field and said second output indicating the direction of rotation of said magnetic field.

11. A method as in claim 9, wherein
said first point is located within a first plane that is coincident with the axis about which said magnetic field is rotating;
said second point is located within a second plane that is coincident with the axis about which said magnetic field is rotating; and
said first plane and said second plane form an angle of about 45 degrees from each other.

12. A method as in claim 9, wherein the rotating magnetic field is created by a rotating magnet that is in mechanical communication with a rotating measuring element located in the path of a flowing fluid.

13. A method as in claim 9, wherein said rotating magnet is cylindrically shaped and contains four separated poles, and wherein said angle between said first plane and said second plane is about 45 degrees.

14. A fluid meter for determining the rate and direction of a fluid flow, comprising:
- a magnet that is rotatable about an axis, said magnet configured such that upon rotation a field of changing magnetic flux polarity is created;
- a measuring element in mechanical communication with said magnet and configured such that upon being placed into the path of fluid flow said measuring element translates the kinetic energy of the moving fluid so as to cause said magnet to rotate about the axis;
- a first bistable ferromagnetic wire that comprises a core and a shell, wherein the core has a higher coercivity than the shell, placed within the field of magnetic flux of said magnet, said first bistable ferromagnetic wire being configured for detecting the changes in magnetic flux polarity occurring upon the rotation of said magnet and providing a first series of signals representing the changes in magnetic flux polarity, said first bistable ferromagnetic wire being located within a first plane that is coincident with the axis about which said magnet is rotatable;
- a second bistable ferromagnetic wire that comprises a core and a shell, wherein the core has a higher coercivity than the shell, placed within the field of magnetic flux of said magnet, said second bistable ferromagnetic wire being configured for detecting the changes in magnetic flux polarity occurring upon the rotation of said magnet and providing a second series of signals representing the changes in magnetic flux polarity, said second bistable ferromagnetic wire being located within a second plane that is coincident with the axis about which said magnet is rotatable, wherein said first plane and said second plane form an angle greater than 0 degrees; and
- means configured for receiving and interpreting said first and second series of signals so as to determining the direction and amount of fluid flow.

15. A fluid meter as in claim 14, wherein said means comprises:
- a first rectifier for receiving said first series of signals and converting the same into a first pulse train of positive pulses and a second pulse train of positive pulses representing said first series of signals;
- a second rectifier for receiving said second series of signals and converting the same into a third pulse train of positive pulses and a fourth pulse train of positive pulses representing said second series of signals;
- a first translator including circuitry for receiving said first and second pulse train and translating the same into a first channel of alternating high and low signals representing said first and second pulse train;
- a second translator including circuitry for receiving said third and fourth pulse train and translating the same into a second channel of alternating high and low signals representing said third and fourth pulse train; and
- decoding circuitry for receiving said first and second channel and determining therefrom the direction and amount of fluid flow.

16. A fluid meter as in claim 14, wherein said angle between said first plane and said second plane is about 45 degrees.

17. A fluid meter as in claim 14, wherein said magnet is cylindrically shaped and further comprises at least 4 poles.

18. A device for measuring fluid flow, comprising:
- a first chamber defining a fluid inlet and a fluid outlet;
- a measuring element configured within said first chamber such that a fluid passing through said first chamber causes said measuring element to rotate;
- a magnet having a centerline and being in mechanical communication with said measuring element such that said magnet rotates with said element about the centerline of said magnet;
- a second chamber attached to said first chamber; and
- a first bistable ferromagnetic wire that comprises a core and a shell, wherein the core has a higher coercivity than the shell, positioned within said second chamber and within the field of magnetic flux of said magnet such that upon said magnet rotating, said first bistable ferromagnetic wire detects the resulting changes in polarity of magnetic flux and provides a first series of alternating electrical pulses corresponding to said changes in polarity detected by said first bistable ferromagnetic wire;
- a second bistable ferromagnetic wire that comprises a core and a shell, wherein the core has a higher coercivity than the shell, positioned within said second chamber and within the field of magnetic flux of said magnet such that upon said magnetic rotating, said second bistable ferromagnetic wire detects the resulting changes in polarity of magnetic flux and provides a second series of alternating electrical pulses corresponding to said changes in polarity detected by said second bistable ferromagnetic wire, said second bistable ferromagnetic wire being positioned relative to said first bistable ferromagnetic wire such that said second bistable ferromagnetic wire does not simultaneously detect the same change in magnetic flux being detected by said first bistable ferromagnetic wire; and
- means in communication with said first and said second bistable ferromagnetic wires, said means configured for receiving and interpreting said first and second series of electrical pulses so as to determine the direction and magnitude of fluid flow.

19. A device as in claim 18, wherein said means in communication with said first bistable ferromagnetic wire and said second bistable ferromagnetic wire comprises:
- a first circuit for transposing said first series of alternating electrical pulses into a first pulse train of positive pulses and a second pulse train of positive pulses corresponding to said first series of alternating electrical pulses;
- a second circuit for transposing said second series of alternating electrical pulses into a third pulse train of positive pulses and a fourth pulse train of positive pulses corresponding to said second series of alternating electrical pulses;
- a third circuit for converting said first and second pulse train into a first channel of alternating high and low states representing said first and second pulse train;
- a fourth circuit for converting said third and fourth pulse train into a second channel of alternating high and low states representing said third and fourth pulse train; and
- a fifth circuit for receiving said first and second channel and determining therefrom the direction and magnitude of fluid flow.

20. A device as in claim 18, wherein said magnet comprises a cylindrically-shaped disk.

21. A device as in claim 18, wherein said magnet has at least four poles.

22. A fluid flow meter, comprising:
   a housing, said housing defining a fluid inlet and a fluid outlet;
   a magnet located within said housing and being rotatable about an axis;
   means for causing said magnet to rotate about the axis as a fluid flows through said housing;
   a first bistable ferromagnetic wire that comprises a core and a shell, wherein the core has a higher coercivity than the shell, positioned within the field of magnetic flux of said magnet, said bistable ferromagnetic wire being located within a first plane coincident with the axis;
   a second bistable ferromagnetic wire that comprises a core and a shell, wherein the core has a higher coercivity than the shell, positioned within the field of magnetic flux of said magnet, said second bistable ferromagnetic wire being located within a second plane coincident with the axis, wherein said first plane and said second plane are at angle greater than zero degrees; and
   circuitry in communication with said first and second bistable ferromagnetic wires and configured such that the magnitude of rotation and direction of rotation of said magnet may be determined.

23. A fluid flow meter as in claim 22, wherein said magnet is cylindrically shaped.

24. A fluid flow meter as in claim 23, wherein said magnet comprises at least four poles.

25. A device for measuring fluid flow, comprising:
   a first chamber defining a fluid inlet and a fluid outlet;
   a rotatable, magnetic member configured within said first chamber such that a fluid passing through said first chamber causes said member to rotate about an axis;
   a second chamber attached to said first chamber;
   a first bistable ferromagnetic wire that comprises a core and a shell, wherein the core has a higher coercivity that the shell, positioned within said second chamber, said first bistable ferromagnetic wire being located within a first plane coincident with said axis and configured for sensing and detecting the changes in polarity of magnetic flux generated upon the rotation of said magnetic member;
   a second bistable ferromagnetic wire that comprises a core and a shell, wherein the core has a higher coercivity that the shell, positioned within said second chamber, said first bistable ferromagnetic wire being located within a second plane coincident with said axis, wherein said first plane and said second plane are at angle greater than zero degrees, said second bistable ferromagnetic wire being configured for sensing and detecting the changes in polarity of magnetic flux generated upon the rotation of said magnetic member; and
   circuitry in communication with said first and second bistable ferromagnetic wires, said circuitry configured such that the magnitude of rotation and direction of rotation of said rotatable, magnetic member may be determined.

26. A device for measuring fluid flow, comprising:
   a first housing defining a fluid inlet arid a fluid outlet;
   a first magnet configured within said first housing such that a fluid passing through said first housing causes said first magnet to rotate;
   a second housing attached to said first housing;
   a second magnetic field located within said second housing, said second magnet being in magnetic communication with said first magnet such that said second magnet rotates about an axis as said first magnet rotates;
   a first bistable ferromagnetic wire that comprises a core and a shell, wherein the core has a higher coercivity than the shell, positioned within said second housing, said first bistable ferromagnetic wire being located within a first plane coincident with said axis and configured for sensing and detecting the changes in polarity of magnetic flux generated upon the rotation of said second magnet about said axis;
   a second bistable ferromagnetic wire that comprises a core and a shell, wherein the core has a higher coercivity than the shell, positioned within said second housing, said bistable ferromagnetic wire being located within a second plane coincident with said axis, wherein said first plane and said second plane are at angle greater than zero degrees, said second bistable ferromagnetic wire being configured for sensing and detecting the changes in polarity of magnetic flux generated upon the rotation of said second magnet about said axis; and
   circuitry in communication with said first and second bistable ferromagnetic wires and configured such that the magnitude of rotation and direction of rotation of said second magnet may be determined.

27. A device for measuring fluid flow as in claim 26, wherein said first and second magnets are cylindrical in shape.

* * * * *